United States Patent
Conrad et al.

(10) Patent No.: US 9,141,167 B2
(45) Date of Patent: *Sep. 22, 2015

(54) APPARATUS AND METHOD TO MANAGE ENERGY USAGE OF A PROCESSOR

(71) Applicant: Intel Corporation, Santa Clara, CA (US)

(72) Inventors: Shaun M. Conrad, Cornelius, OR (US); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/788,794

(22) Filed: Mar. 7, 2013

(65) Prior Publication Data

US 2014/0189405 A1    Jul. 3, 2014

Related U.S. Application Data

(63) Continuation of application No. 13/729,908, filed on Dec. 28, 2012.

(51) Int. Cl.
*G06F 1/32* (2006.01)

(52) U.S. Cl.
CPC ............ *G06F 1/3203* (2013.01); *G06F 1/3206* (2013.01); *G06F 1/3296* (2013.01)

(58) Field of Classification Search
USPC ......................................... 713/300, 320, 323
See application file for complete search history.

(56) References Cited

U.S. PATENT DOCUMENTS

| | | | |
|---|---|---|---|
| 2005/0223259 A1* | 10/2005 | Lehwalder et al. | 713/330 |
| 2005/0283625 A1* | 12/2005 | Rotem et al. | 713/300 |
| 2009/0085545 A1* | 4/2009 | Shen et al. | 323/283 |
| 2010/0031071 A1* | 2/2010 | Lu et al. | 713/323 |
| 2011/0173474 A1* | 7/2011 | Salsbery et al. | 713/323 |
| 2012/0331310 A1 | 12/2012 | Burns et al. | |
| 2013/0086396 A1* | 4/2013 | Liu | 713/300 |
| 2013/0103980 A1* | 4/2013 | Sasaki | 714/14 |
| 2013/0138985 A1* | 5/2013 | Wang et al. | 713/320 |
| 2013/0305068 A1* | 11/2013 | Jung | 713/322 |
| 2014/0137137 A1* | 5/2014 | Yan et al. | 719/322 |
| 2014/0189402 A1* | 7/2014 | Conrad et al. | 713/323 |

FOREIGN PATENT DOCUMENTS

| | | |
|---|---|---|
| WO | WO 01-27728 A1 | 4/2001 |
| WO | WO 01-69767 A2 | 9/2001 |
| WO | WO 2010-121819 A1 | 12/2010 |
| WO | WO 2012-040052 A2 | 3/2012 |

OTHER PUBLICATIONS

International Search Report and Written Opinion for International Application No. PCT/US2013/048416 mailed Jan. 7, 2014.

* cited by examiner

*Primary Examiner* — Vincent Tran
(74) *Attorney, Agent, or Firm* — Trop, Pruner & Hu, P.C.

(57) ABSTRACT

In an embodiment, a processor includes at least one processor core and power control logic having energy usage logic to predict an energy usage of the processor and a voltage regulator coupled to the processor, during a low power period according to a first voltage regulator control mode and a second voltage regulator control mode, and to control the voltage regulator based at least in part on the predicted energy usage. Other embodiments are described and claimed.

20 Claims, 8 Drawing Sheets

APPARATUS AND METHOD TO MANAGE ENERGY USAGE OF A PROCESSOR

This application is a continuation of U.S. patent application Ser. No. 13/729,908, filed Dec. 28, 2012, the content of which is hereby incorporated by reference.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy usage. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

To save energy during periods of low activity, a processor may be placed in an idle power state, e.g., one of states C1 to CN that consumes less power than when the processor is in an active state, according to the Advanced Configuration and Power Interface (ACPI) standard, e.g., Rev. 5.0, published November, 2011.

DETAILED DESCRIPTION

In various embodiments, a processor may be placed from an active state, e.g., C0, into an idle power state, e.g., a low power state such as one of the C1-CN states. Placement of the processor in the idle power state typically includes reduction of voltage of a system that includes the processor and decoupling capacitors. The voltage reduction may be actively managed by a voltage regulator controller that controls a voltage regulator (VR), which typically is external to the processor. The voltage reduction may also be accomplished by passive reduction of the voltage, e.g., through bleed-off of stored charge in the processor and the capacitors. In some situations, passive reduction of the processor voltage to a steady-state idle voltage, e.g., shutoff (or reduction in operating voltage) of the voltage regulator and/or reduction in operation capacity of other processor circuitry during voltage reduction period can result in a reduction of energy cost.

However, when the processor is to be reinstated to the active state the voltage regulator and/or processor circuitry may need to be activated. For example, the VR can have an associated energy cost of VR reactivation. In some circumstances, the energy cost saved by shutoff (or reduced operating voltage) of the VR (or reduction of circuitry operation capacity) during voltage reduction is outweighed by the energy cost of VR reactivation/circuitry reinstatement. In various embodiments, energy cost prediction logic within the processor can predict a first energy cost associated with a first power modification plan that includes passive voltage reduction, maintenance of the processor voltage during the idle power state (e.g. low power state C3), and voltage reinstatement (which may include VR activation or reinstatement from a reduced operating voltage to a full operating voltage, and/or processor circuit reactivation to full operation). The energy cost prediction logic may compare the first predicted energy cost to a second predicted energy cost associated with a second power modification plan that includes active voltage reduction, maintenance of the processor voltage during the idle power state, and voltage reinstatement (without energy costs, e.g., to reactivate the VR or processor circuitry). Based at least in part on this comparison, the energy cost prediction logic can select the power modification plan that has a smaller associated energy cost. Modification of the processor power level, e.g., voltage reduction to idle voltage, maintenance of idle voltage during an idle period, and voltage reinstatement can be executed according to the selected power modification plan.

Although the scope of the present invention is not limited in this regard, deep low power state re-entry control as described herein can be implemented via firmware, hardware, software, and combinations thereof, e.g., via voltage control logic that may be external to, or internal to the processor.

Figure 1:
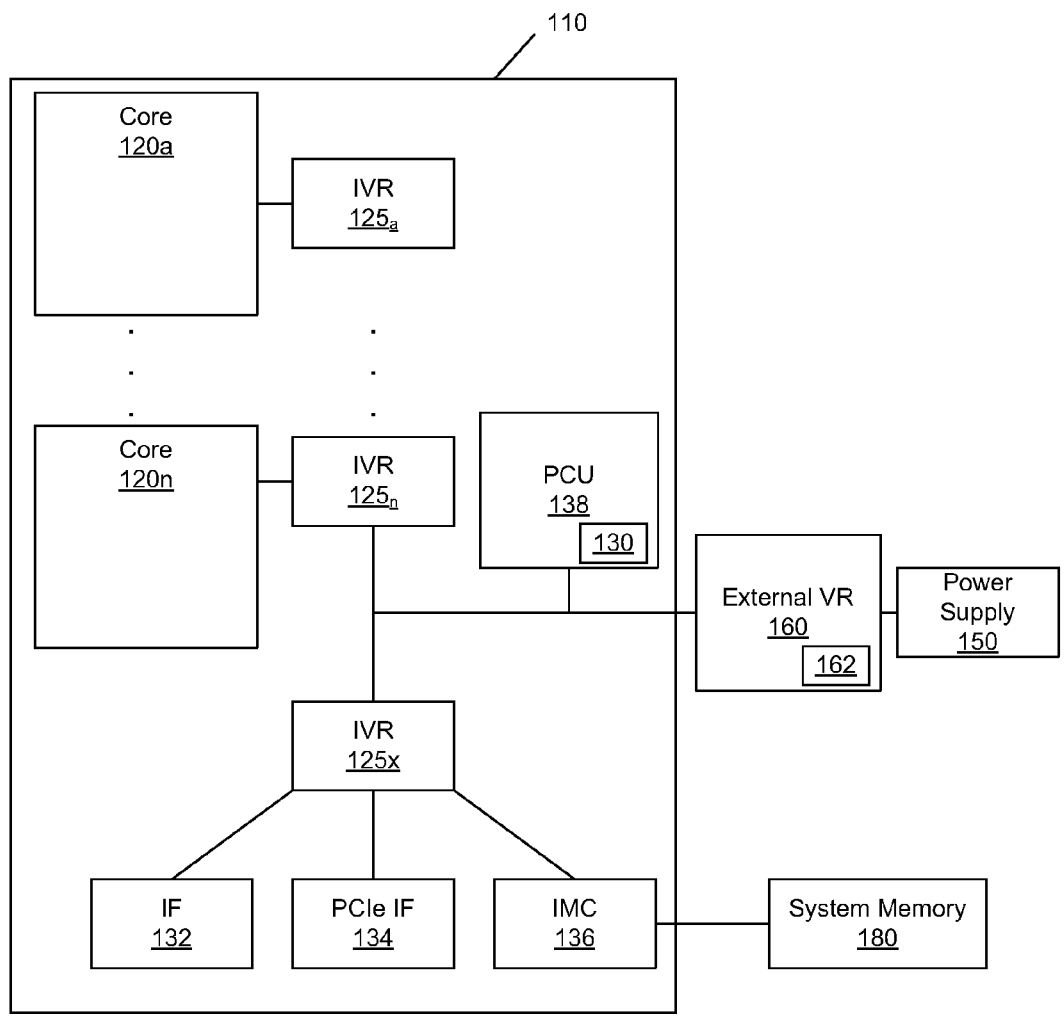
FIG. 1 is a block diagram of a system according to an embodiment of the present invention.

Referring now to FIG. 1, shown is a block diagram of a portion of a system in accordance with an embodiment of the present invention. As shown in FIG. 1, system 100 may include various components, including a processor 110, which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, an integrated voltage regulator (IVR) implementation may be provided to allow for fine-grained control of voltage and thus power and performance of each individual core.

Still referring to FIG. 1, additional components may be present within the processor including an input/output interface 132, another interface 134, and an integrated memory controller (IMC) 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform operations with regard to package low power state entry and re-entry in accordance with an embodiment of the present invention. Furthermore, PCU 138 may be coupled via a dedicated interface to external voltage regulator 160, which includes a voltage regulator controller 162. In this way, PCU 138 can instruct the voltage regulator 160 (e.g., via voltage regulator controller 162) to provide a requested regulated voltage to the processor 110. In an embodiment, the VR controller 162 may be a microcontroller such as an 8051-based controller or other such controller configured to execute programmable instructions.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. And further understand that while the embodiment shown in FIG. 1 is with regard to a multicore processor further including integrated graphics engines, other implementations can be used in connection with single core processors and/or multicore processors not including graphics engines (or including only a single such graphics engine) and not including integrated VRs.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the power control associated with one or more voltage regulators described herein may be independent of and complementary to an operating system (OS)-based mechanism, such as the ACPI standard. With regard to power states, ACPI specifies different power usage states, generally referred to as C-states, C0, C1 to Cn states. When a core is active, it runs at a C0 state, and when the core is idle it may be placed in a core low power state, also called a core non-zero C-state (e.g., C1-C6 states).

When all cores of a multicore processor are in a core low power state, the processor can be placed in a package low power state, such as a package C6 low power state which is a deep low power state in which certain clock generation circuitry including phase locked loops (PLLs) are turned off (e.g., PLLs in an uncore portion), internal voltages of uncore rails are reduced and core caches and core state are flushed to a shared cache memory, e.g., a last level cache.

Energy usage logic 130 within the PCU 138 may predict an energy cost associated with each of a plurality of power modification plans. For example, a power modification plan can include information associated with a reduction of the processor voltage from an active power state to an idle power state (e.g., C3, or C6), maintenance of the processor in the idle power state for a processor idle time period, and reinstatement of the processor to an active state, and each power modification plan can be accomplished according to a distinct voltage modification plan that specifies target voltages and associated time periods for each target voltage. In some embodiments, each power modification plan is stored in a table of power modification plans, and each power modification plan may be associated with a corresponding processor application.

The prediction of the energy cost of the voltage reduction phase of a power modification plan may be based on data received from the VR controller 162 or stored in another location, e.g., voltage v. time for a previous voltage reduction, e.g., a length of time for the processor voltage to reach an idle voltage $V_{idle}$ beginning at an active voltage $V_{active}$ in a previous power modification. For example, data may be recorded and stored for a most recent power modification (associated with a program application) including voltage reduction to a processor idle state, maintenance of the processor at the processor idle power for an idle time period, and reinstatement of the processor to an active processor state. The usage logic 130 can select a power modification plan that has a smaller associated energy cost than the other power modification plans, and can direct the voltage regulator controller 162 to conduct the power modification (e.g., voltage reduction from active voltage to idle voltage, maintenance at idle voltage for a specified idle time period, and reinstatement of the processor to active voltage) according to the selected power modification plan. Various power modification plans to accomplish power modification can be compared. For instance, one power modification may include active voltage regulation by the external VR 160 throughout a voltage modification time period, e.g., from beginning of processor voltage reduction through reinstatement of active processor voltage. Another power modification plan may include passive reduction in voltage during a portion of the voltage modification period. Other power modification plans may include other approaches to conserve energy during portions of voltage modification, e.g., shutoff of various processor circuitry (e.g., clock circuits) during portions of the voltage modification period.

The energy usage logic 130 may calculate predicted energy cost associated with each of the several power modification plans. For example, the energy usage logic 130 may calculate a first energy cost associated with a first power modification plan that includes a first energy cost first portion due to passive voltage reduction to the idle voltage, e.g., shutoff of the external VR 160 while the processor voltage is permitted to decay until it reaches the intended idle voltage of a selected low power state (e.g., C3 or C6). A second portion of the first energy cost may include energy expended during the idle power state (also "idle phase"), e.g., energy expended by the processor 110 at a low voltage (idle) state, and may also include a "wake-up" energy cost to reinstate the external VR 160 after it has been shut off (e.g., the VR 160 to regulate the processor voltage during the idle phase). A third portion of the first energy cost may include energy expended to reinstate the processor to the active state, including energy supplied to the processor 110 and energy expended by the external VR 160 during reinstatement.

Further, the energy usage logic 130 may calculate a second energy cost associated with a second power modification plan that includes an active control of the processor voltage by the external VR 160. A first portion of the second energy cost may include energy expended in actively reducing the processor voltage, e.g., by the external VR 160. A second portion of the second energy cost may include energy expended during the idle power state and may include energy expended by the external VR 160 to supply an idle power state voltage. A third portion of the second energy cost may include energy expended during the reinstatement of the processor to the active state and may include energy expended by the external VR 160 during the reinstatement of the processor to the active state. The energy usage logic may add up the first, second, and third portions of the second energy cost to arrive at the second energy cost.

The energy usage logic 130 may perform a comparison of the first energy cost to the second energy cost and may select the power management plan with the smaller energy cost. The VR controller 162 may perform the power modification according to the selected power modification plan.

In an example, the processor is to become idle, e.g., enter the C6 state in which the processor voltage is to go to zero volts. The energy usage logic may determine, from a history of processor usage in a similar programming environment, e.g., stored in storage (e.g., DRAM) and retrievable upon request by the energy usage logic, and a current programming environment, that the processor has a high likelihood of reduction of the processor voltage to zero volts before the processor is to be reinstated to the active state, e.g., C0. The energy usage logic 130 may calculate a first modification plan energy usage associated with passive voltage decay of the processor to zero volts, passive maintenance at zero volts, and subsequent reactivation of the processor. Because the target voltage is zero volts, there is no need to actively regulate the processor voltage during the voltage decay (as might be needed if the target voltage were a non-zero value), and hence there will be energy saved in shutdown of the VR 160 during the decay phase and the idle phase. There may be a reactivation energy cost associated with reactivation of the VR 160. The energy usage logic 130 may determine the first modification plan energy usage as the sum of the energy usage associated with each of the passive decay phase, idle phase, and reinstatement phase.

The energy usage logic may determine a second energy usage in which the voltage regulator remains active throughout the voltage reduction phase, idle phase, and reinstatement phase. By maintenance of the VR in the active state throughout the voltage reduction to reinstatement period, there is no cost associated with reactivation of the VR 160. However, there would be an energy cost associated with maintenance of the VR in the active state throughout the power modification. (In other embodiments, the VR may be operated at one or more reduced levels during some portions of the voltage reduction to reinstatement period, with an associated energy cost).

The energy usage logic 130 may compare the first energy usage to the second energy usage, and may select one of the first and second power modification plans based comparison of associated energy usage, e.g., the power modification plan that has the smaller energy usage. The energy usage logic 130 may then direct the VR controller 162 to execute the selected power modification plan.

The energy usage logic 130 is to determine the selection of the power modification plan based on available information, e.g., initial decay data, processor history, and hysteresis data. In an embodiment, the processor may receive an indication of a wake-up event during the voltage decay phase and may abort the decay to ramp up the processor voltage to the active voltage, which may affect actual energy usage of the system 100.

Figure 2:
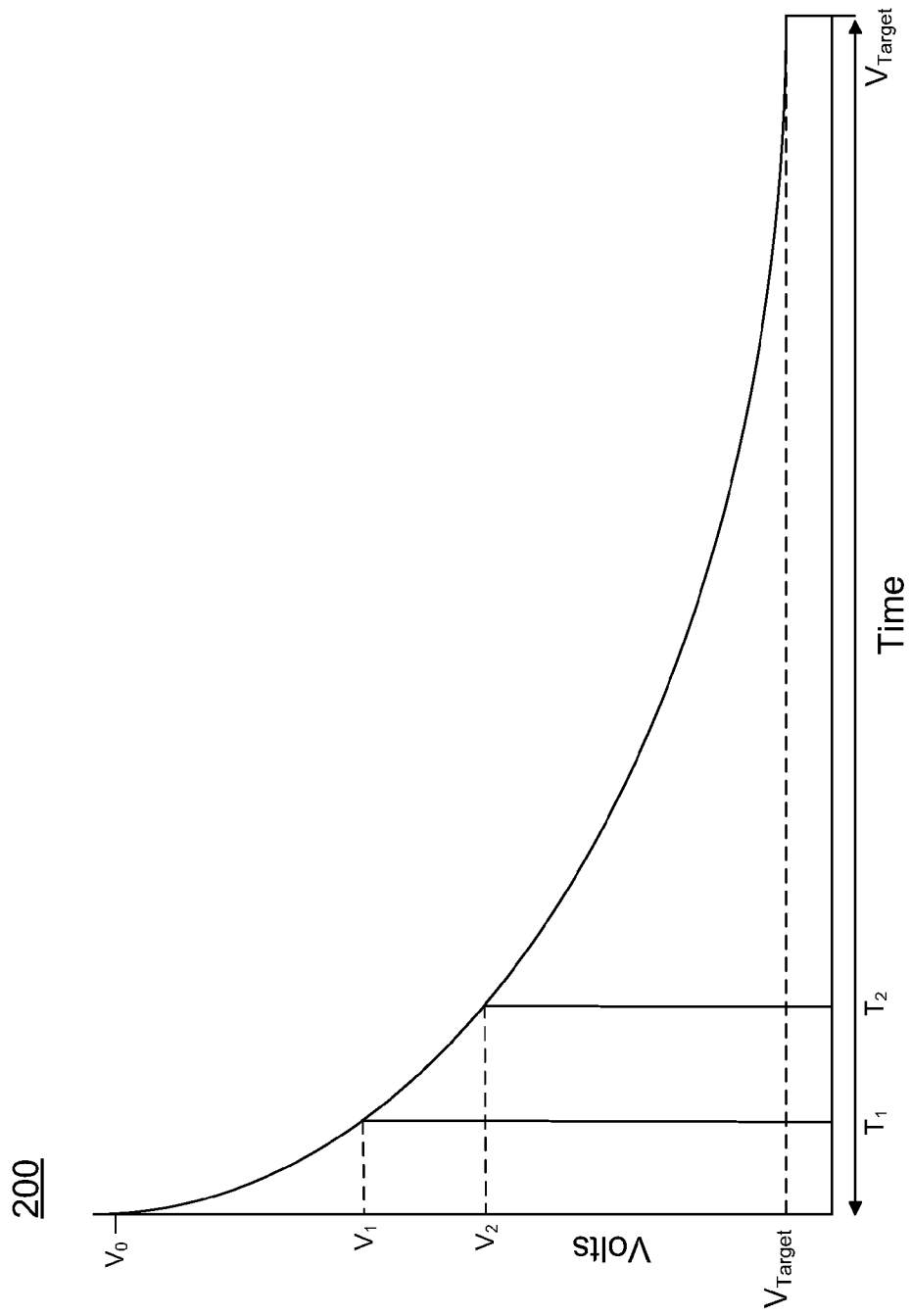
FIG. 2 is a voltage decay graph according to an embodiment of the present invention.

Referring now to FIG. 2, shown is a voltage decay graph 200 according to an embodiment of the present invention. The graph depicts passive voltage decay of the processor, e.g., voltage regulator de-activated, or a processor circuit that consumes energy is turned off, or another circuit that consumes energy is turned off. Energy usage logic of a processor, such as the energy usage logic 130, may receive initial voltage decay data, e.g., $V_1$ measured at time $T_1$, and $V_2$ measured at time $T_2$, and the energy usage logic may predict a passive voltage decay time period ($T=0 \rightarrow T_{idle}$) based on the initial voltage decay data.

Based on the voltage decay time period and a predicted length of time that the processor is expected to be in the idle power state, the energy usage logic can predict first energy usage for a first power modification plan that includes passive voltage decay, which can be compared with a prediction of second energy usage of the processor for a second power modification plan that includes, e.g., active control of the voltage decay phase and idle phase by a voltage regulator coupled to the processor, or active use of the processor circuit, or active use of another circuit that consumes energy. The energy usage logic may determine which power modification plan to invoke based on the energy usage comparison.

Figure 3:
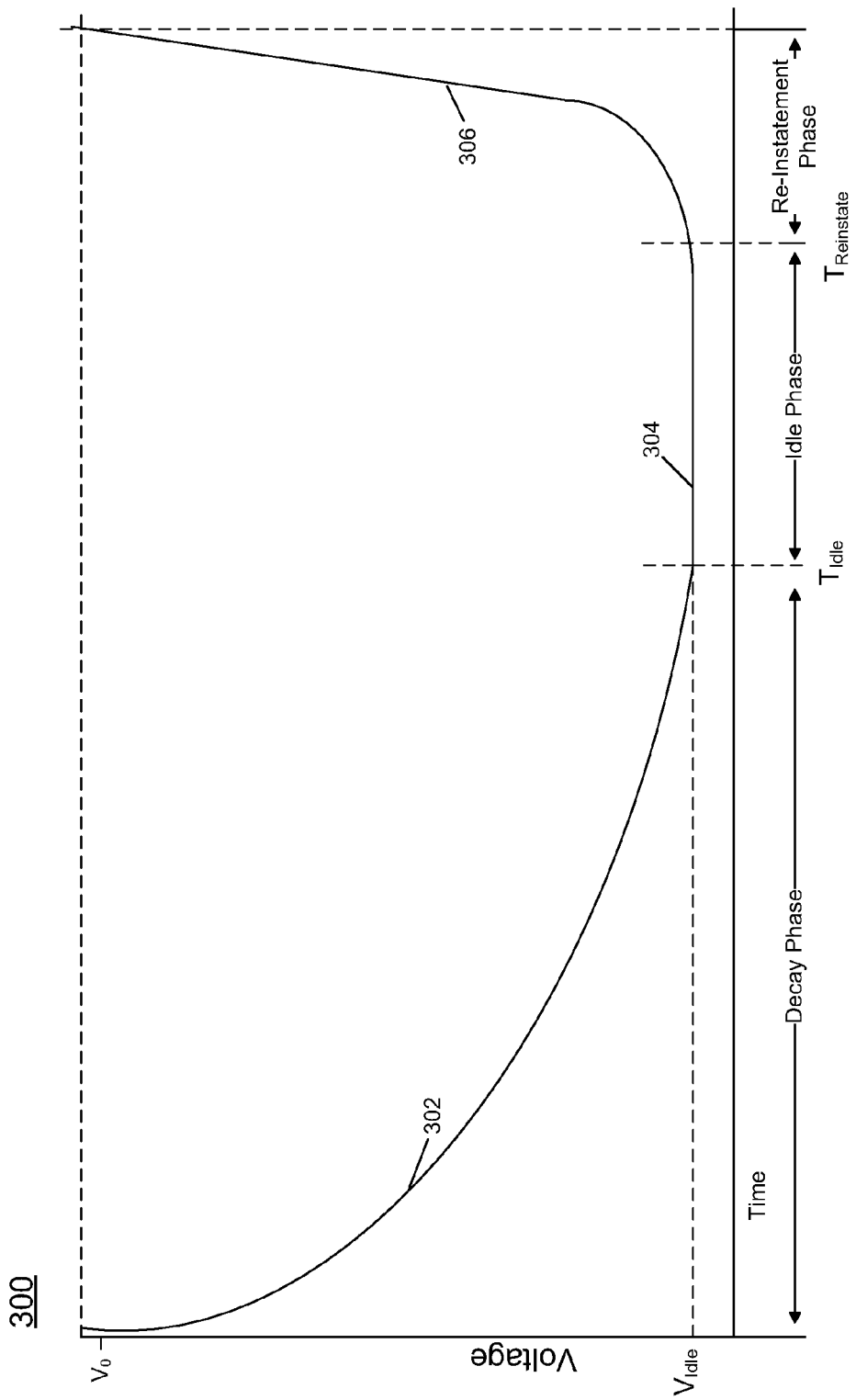
FIG. 3 is a voltage versus time graph according to an embodiment of the present invention.

Referring now to FIG. 3 shown is a graph 300 of processor voltage v. time, according to an embodiment of the invention. A first portion 302 of the graph 300 represents a voltage decay phase of a power modification of the processor from a processor active state, e.g. C0 with initial processor voltage $V_0$, to a processor idle power state e.g., C3, or C6, with processor voltage $V_{idle}$. During an idle phase 304 processor voltage remains at $V_{idle}$. During a reinstatement phase 306 the processor voltage is reinstated from $V_{idle}$ to the initial voltage $V_0$.

Based on initial voltage versus time data received from, e.g., a voltage regulator controller, energy usage logic within a processor may predict a time $T_{idle}$ at which the processor arrives at the idle processor voltage $V_{idle}$, and the energy usage logic may predict based, e.g., on processor history, a time period ($\Delta T = T_{reinstate} - T_{idle}$) during which the processor is in the idle power state. The energy usage logic may determine a first energy cost associated with a first power modification plan for the decay phase, the idle phase, and the reinstatement phase with passive voltage decay, e.g., voltage regulator shut off during voltage decay, the first energy cost determined based on $T_{idle}$, $\Delta T$, energy to reactivate the voltage regulator, and other information. The energy usage logic may also determine a second energy cost associated with a second power modification plan in which the voltage regulator is actively regulating processor voltage throughout the decay phase, the idle phase, and the reinstatement phase. The energy usage logic may select one of the first modification plan and the second modification plan based on a comparison of corresponding energy usage.

Figure 4:
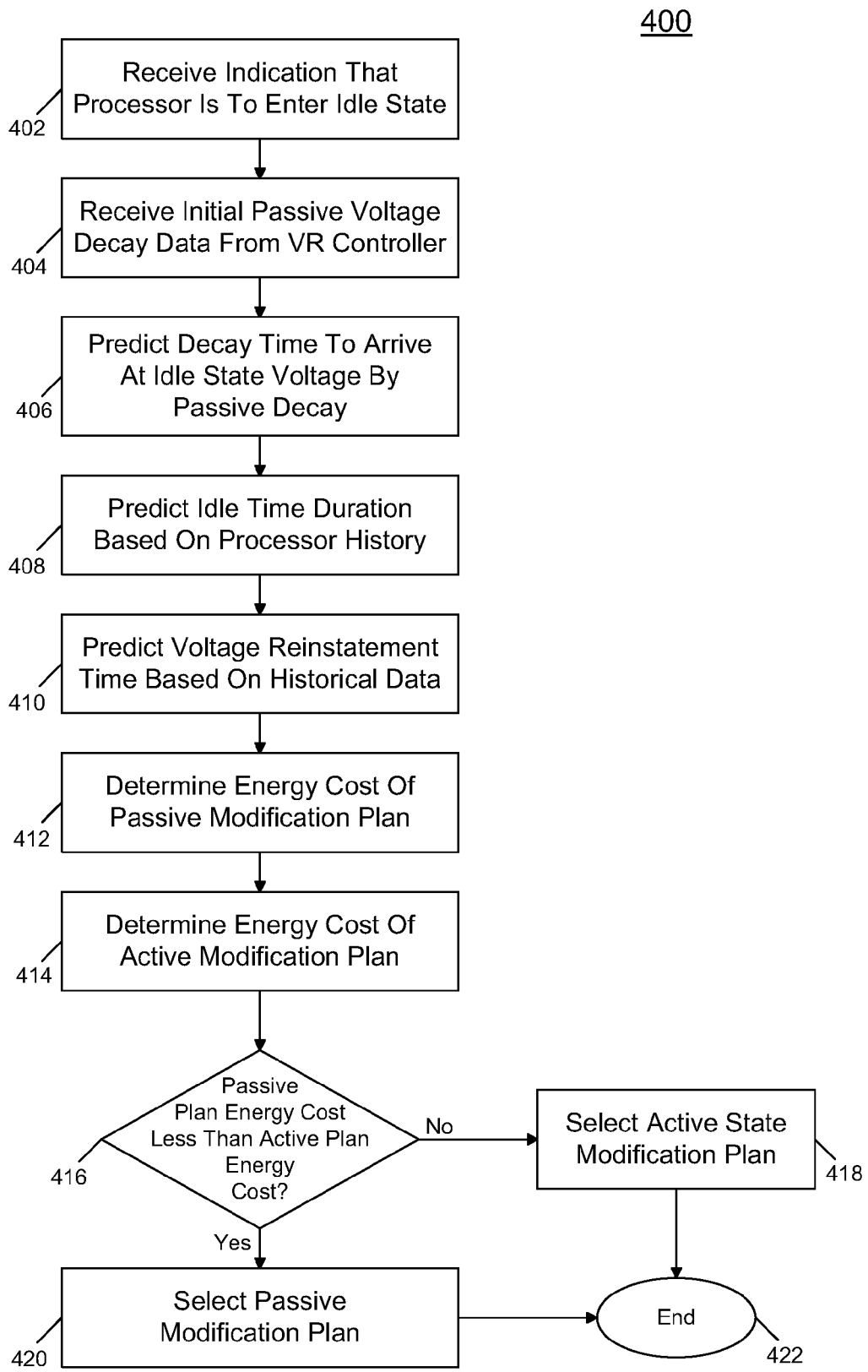
FIG. 4 is a flow diagram according to an embodiment of the present invention.

Referring now to FIG. 4, shown is a method 400 of selecting a power modification plan for a processor based on energy considerations, according to an embodiment of the present invention. At block 402 an indication is received that the processor is to enter an idle power state, e.g., a power state that consumes less power than an active state of the processor, e.g., received in the power control unit from an operating system or other software entity. The power control unit may effect controls to cause appropriate low power entry activities and instructions to a voltage regulator (VR) to reduce processor voltage. Continuing to block 404, passive voltage decay data is received at energy usage logic of the processor from storage and based on one or more previously executed power modification plans. Advancing to block 406, the energy usage logic is to predict, based on the previously stored voltage decay data, a passive voltage decay time to arrive at a processor idle power state. Moving to block 408, the energy usage logic is to predict processor idle time duration based on processor history associated with a current program application. Proceeding to block 410, the energy usage logic is to predict a voltage reinstatement time period based on, e.g., electrical characteristics of the processor and voltage regulator and previously recorded historical data. Continuing to block 412, the energy usage logic is to determine an energy cost associated a first power modification plan (e.g., passive decay phase, and possibly unregulated idle phase). Advancing to block 414, the energy usage logic is to determine an energy cost associated a second modification plan (e.g., actively managed voltage reduction by voltage regulator controller, active control of voltage at idle power state). Moving to decision diamond 416, the energy usage logic is to compare a passive plan energy cost associated with the passive modification plan to an active plan energy cost associated with the active modification plan. If the passive plan energy cost is greater than the active plan energy cost, then proceeding to block 418, the energy usage logic is to select the active power modification plan. If the active plan energy cost is greater than the passive plan energy cost, continuing to block 420, the energy usage logic is to select the passive power modification plan. The method ends at 422. Other examples may include consideration of other power modification plans, e.g., additional voltage reduction steps prior to arrival at an intended processor idle state, considerations of interruption during voltage reduction, e.g., "wakeup" call (e.g., wakeup instruction) to the processor, etc. Upon selection of the power modification plan with the smaller energy usage, the energy usage logic may effect voltage modification according to the selected power modification plan.

Figure 5:
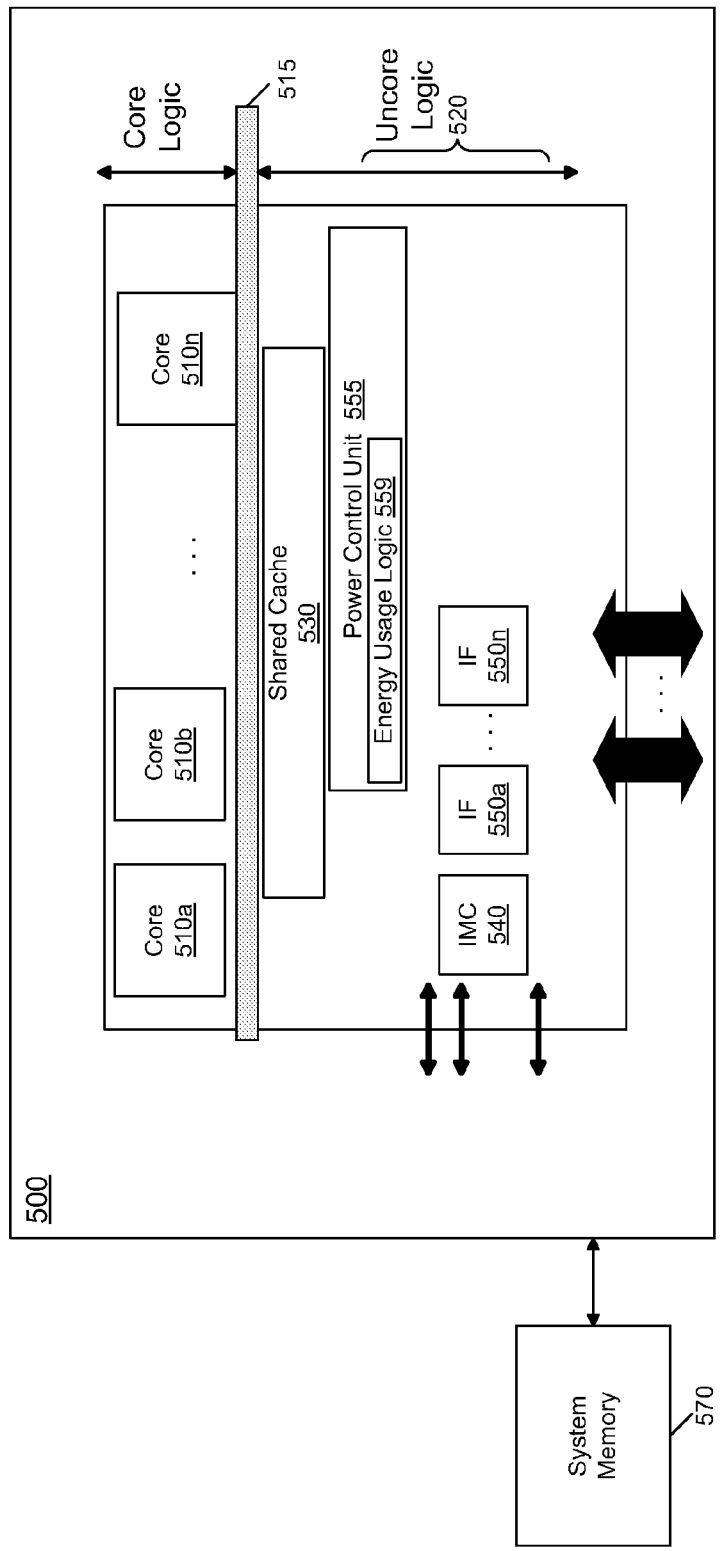
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 500 may be a multicore processor including a plurality of cores $510_a$-$510_n$. In one embodiment, each such core may be of an independent power domain and can be configured to enter and exit active states and/or low power states based on workload. The various cores may be coupled via an interconnect 515 to a system agent or uncore 520 that includes various components. As seen, the uncore 520 may include a shared cache 530 which may be a last level cache. In addition, the uncore 520 may include an integrated memory controller (IMC) 540, various interfaces $550_a$ $550_n$ and a power control unit 555. In various embodiments, power control unit 555 may include energy usage logic 559 in accordance with an embodiment of the present invention, to select a power modification plan based at least in part on energy usage considerations.

With further reference to FIG. 5, processor 500 may communicate with system memory 570, e.g., via a memory bus. In addition, by interfaces 550, connection can be made to various off-chip components such as peripheral devices, mass storage and so forth.

While shown with this particular implementation in the embodiment of FIG. 5, the scope of the present invention is not limited in this regard.

Figure 6:
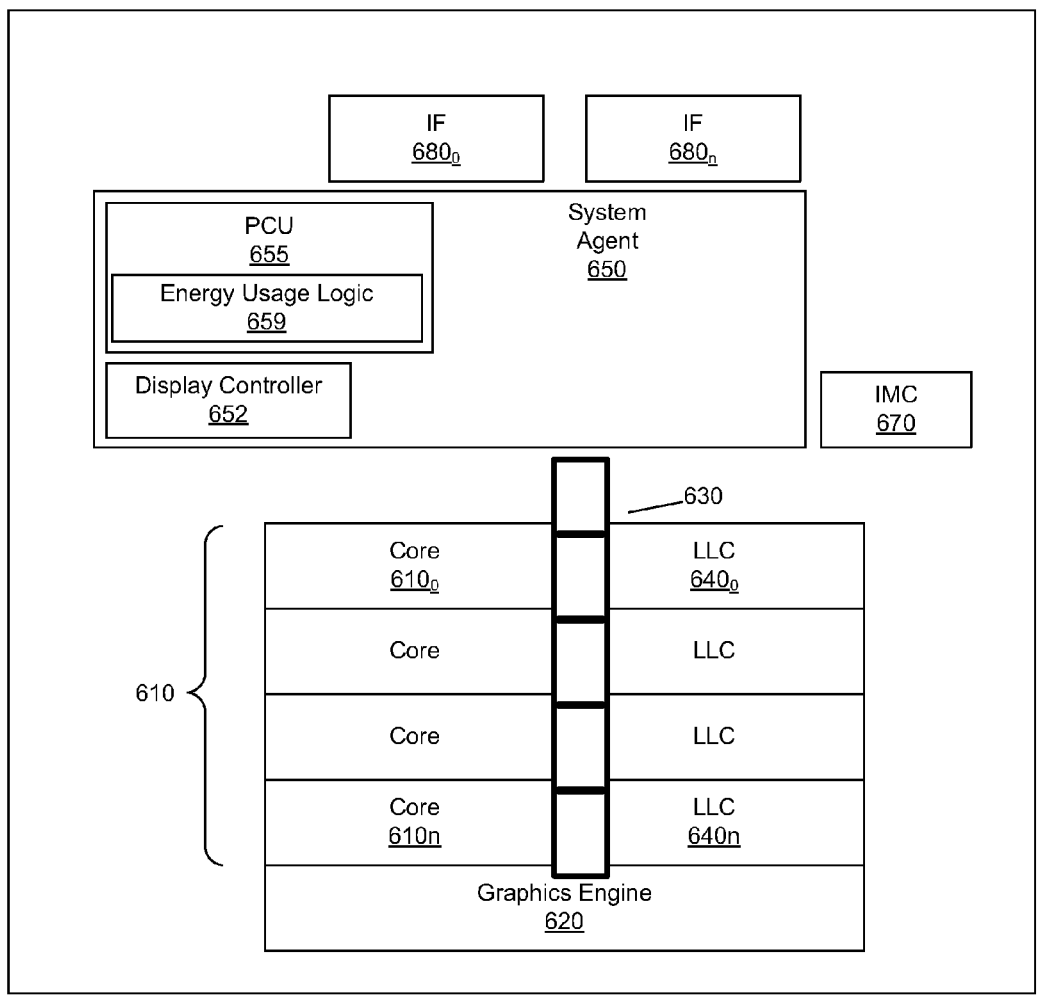
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 600 includes multiple domains. Specifically, a core domain 610 can include a plurality of cores $610_0$-$610_n$, a graphics domain 620 can include one or more graphics engines, and a system agent domain 650 may further be present. In some embodiments, system agent domain 650 may execute at an independent frequency than the core domain (and/or an independent voltage from the core domain) and may remain powered on at all times to handle power control events and power management such that domains 610 and 620 can be controlled to dynamically enter into and exit high power and low power states. Each of domains 610 and 620 may operate at different voltage and/or power. Note that while only shown with three domains, understand the scope of the present invention is not limited in this regard and additional domains can be present in other embodiments. For example, multiple core domains may be present each including at least one core.

In general, each core 610 may further include low level caches in addition to various execution units and additional processing elements. In turn, the various cores may be coupled to each other and to a shared cache memory formed of a plurality of units of a last level cache (LLC) $640_0$-$640_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. In one embodiment, interconnect 630 can be part of the core domain. However in other embodiments the ring interconnect can be of its own domain.

As further seen, system agent domain 650 may include display controller 652 which may provide control of and an interface to an associated display. As further seen, system agent domain 650 may include a power control unit 655 which can include energy usage logic 659 in accordance with an embodiment of the present invention.

As further seen in FIG. 6, processor 600 can further include an integrated memory controller (IMC) 670 that can provide for an interface to a system memory, such as a dynamic random access memory (DRAM). Multiple interfaces $680_0$-$680_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
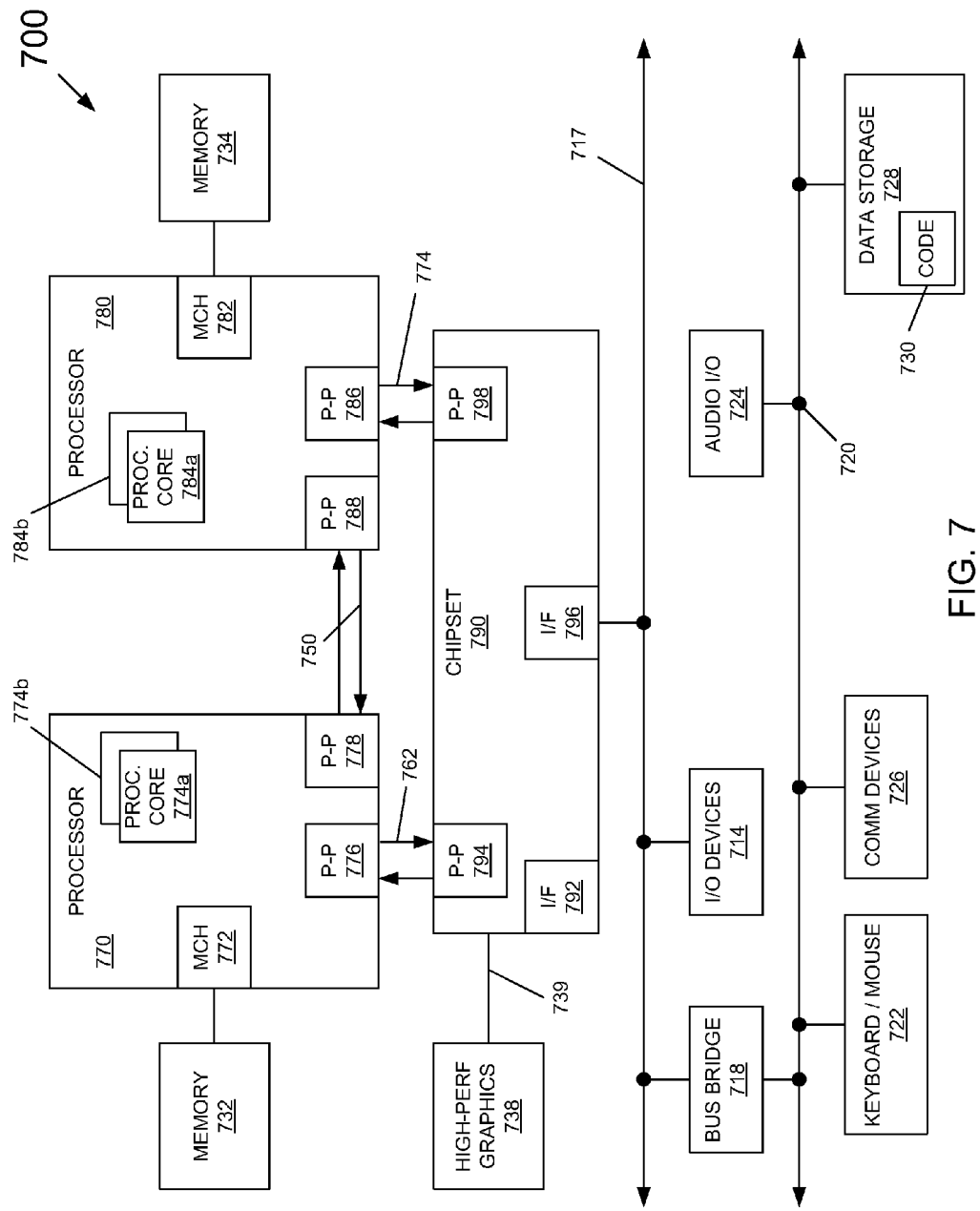
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. Each of the processors can include a power control unit (PCU) including energy usage logic, as described herein.

Still referring to FIG. 7, first processor 770 further includes a memory controller hub (MCH) 772 and point-to-point (P-P) interfaces 776 and 778. Similarly, second processor 780 includes a memory controller hub (MCH) 782 and P-P interfaces 786 and 788. Memory MCHs 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

Figure 8:
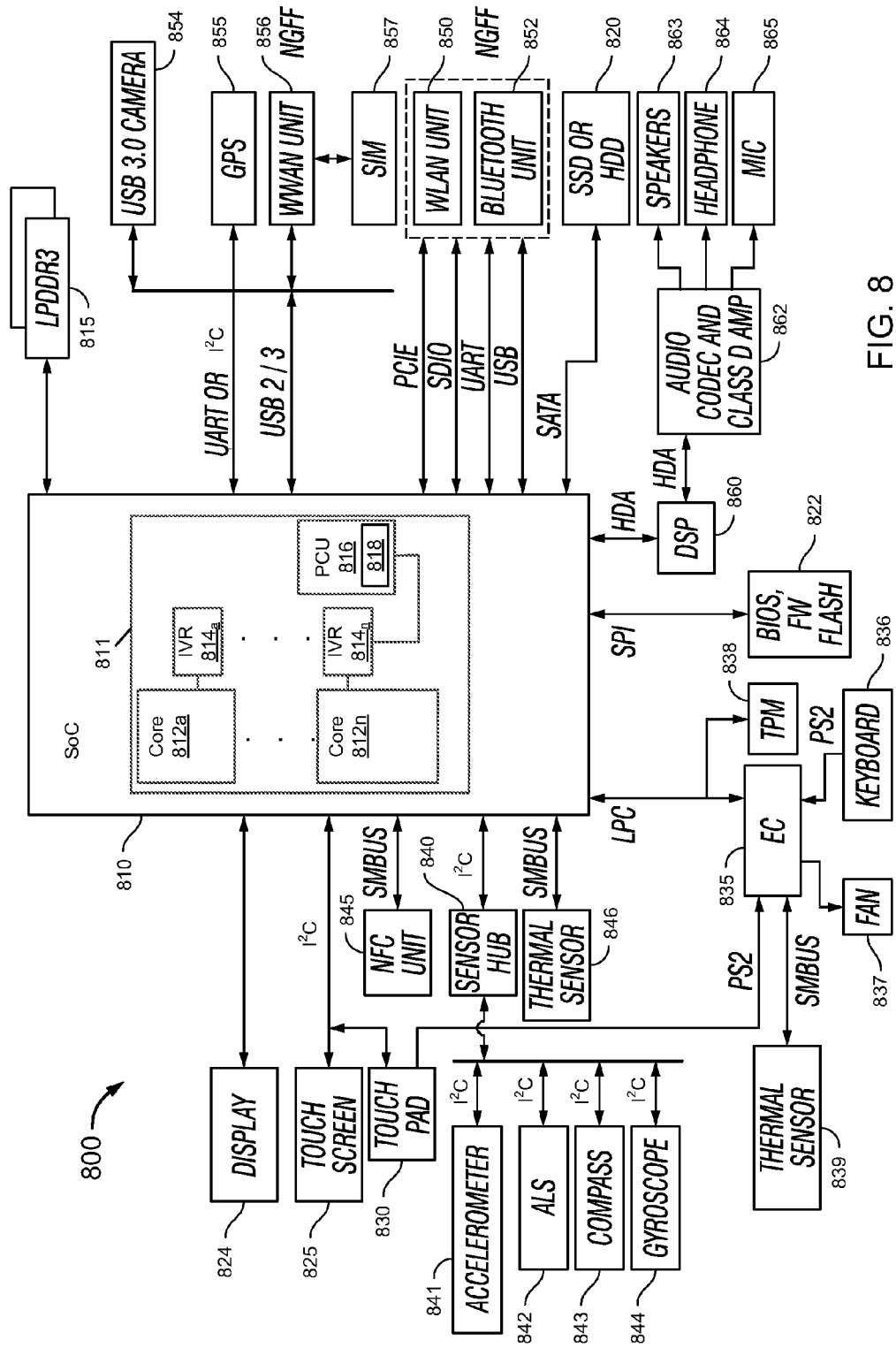
FIG. 8 is a block diagram of components present in a computer system in accordance with an embodiment of the present invention.

Referring now to FIG. 8, shown is a block diagram of components present in a computer system in accordance with an embodiment of the present invention. As shown in FIG. 8, system 800 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 8 is intended to show a high level view of many components of the computer system. However, it is to be understood that additional components may be present in certain implementations and furthermore, different arrangement of the components shown may occur in other implementations.

As seen in FIG. 8, a processor 810, which may be a low power multicore processor socket such as an ultra low voltage processor, may act as a main processing unit and central hub for communication with the various components of the system. Such processor can be implemented as a system on a chip (SoC) as described herein. In one embodiment, processor 810 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 810 may include central processing unit (CPU) 811 that includes a plurality of cores 812a-812n. Each core may have a corresponding integrated voltage regulator $814_a$-$814_n$. The CPU 811 may also include power control unit (PCU) 816 that includes power control logic 818 to predict energy cost of various power modification plans and to select one of the power modification plans based at least on energy considerations, as in embodiments of the present invention.

Processor 810 may communicate with a system memory 815, which in an embodiment can be implemented via multiple memory devices to provide for a given amount of system memory. To provide for persistent storage of information such as data, applications, one or more operating systems and so forth, a mass storage 820 may also couple to processor 810. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

Various input/output (IO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I²C interconnect. As further shown in FIG. 8, in addition to touch screen 825, user input by way of touch can also occur via a touch pad 830 which may be configured within the chassis and may also be coupled to the same I²C interconnect as touch screen 825.

For perceptual computing and other purposes, various sensors may be present within the system and can be coupled to processor 810 in different manners. Certain inertial and environmental sensors may couple to processor 810 through a sensor hub 840, e.g., via an I²C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which may couple to processor 810 via a system management bus (SMBus) bus, in one embodiment.

Also seen in FIG. 8, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
at least one processor core; and
a power controller having energy usage logic to predict for each mode of a plurality of modes of operation a corresponding energy usage of the processor and a voltage regulator during a low power period in which the voltage regulator is to supply the at least one processor core with a voltage that is less than a first voltage at which the at least one processor core is fully active, and to select, based on the corresponding energy usage, one of the modes to operate the processor during the low power period, wherein according to a first mode the voltage regulator is to be deactivated during a first temporal portion of the low power period and the voltage regulator is to be activated during a second temporal portion of the low power period, wherein the voltage regulator is to maintain the voltage at approximately a second voltage during the second temporal portion.

2. The processor of claim 1, wherein according to a second mode the power controller is to control the voltage regulator to:
actively reduce the voltage from the first voltage to the second voltage during the first temporal portion of the low power period; and
after the voltage is reduced to the second voltage, actively maintain the voltage at the second voltage in the second temporal portion of the low power period.

3. The processor of claim 2, wherein according to the second mode the power controller is to control the voltage regulator to actively regulate the voltage during a third temporal portion of the low power period in which the voltage is to be increased from the second voltage to the first voltage.

4. The processor of claim 1, wherein according to the first mode the energy usage logic is further to control the voltage regulator to regulate the voltage during a third temporal portion of the low power period wherein the voltage is to be increased from the second voltage to the first voltage.

5. The processor of claim 1, wherein according to a third mode the energy usage logic is further to control the voltage regulator to:
deactivate during the first temporal portion of the low power period wherein the voltage is to be reduced from the first voltage to the second voltage;
deactivate during a second temporal portion of the low power period in which the voltage is to be reduced from the second voltage to a third voltage; and
actively regulate the voltage during a third temporal portion of the low power period in which the voltage is to be increased from the third voltage to the first voltage.

6. The processor of claim 1, wherein the corresponding energy usage according to the first mode comprises:
a reactivation energy of the voltage regulator; and
a voltage regulator operation energy consumed for the second temporal portion of the low power period and during a third temporal portion of the low power period wherein the voltage is raised from the second voltage to the first voltage.

7. The processor of claim 1, wherein the energy usage logic is to predict the energy usage according to the first mode by:
prediction, based on processor history data, of a duration of the second temporal portion;
determination of voltage regulator first energy usage during the second temporal portion;
determination of voltage regulator second energy usage during a third temporal portion wherein the voltage is to be increased from the second voltage to the first voltage;
determination of processor energy usage during the second temporal portion and the third temporal portion;
determination of voltage regulator reactivation energy usage to reactivate the voltage regulator after deactivation; and
addition of the voltage regulator first energy usage, the voltage regulator second energy usage, the processor energy usage and the voltage regulator reactivation energy usage.

8. The processor of claim 7, wherein prediction of the energy usage according to the first mode further comprises prediction of a duration of the third temporal portion based at least in part on historical data.

9. A system comprising:
a voltage regulator; and
a processor having at least one processor core and energy usage logic to predict energy usage of the processor and the voltage regulator during a low power period according to a first plan and a second plan, wherein according to the first plan the voltage regulator is to be in an active state throughout the low power period, and according to the second plan the voltage regulator is to be inactive during at least a first portion of the low power period wherein a processor voltage to be supplied to the processor is to be reduced from a first voltage to a second voltage less than the first voltage and the voltage regulator is to be active during a second portion of the low power period wherein the processor voltage is to be maintained at approximately the second voltage, and to select one of the first and second plans based on a comparison of the energy usage according to the first and second plans.

10. The system of claim 9, wherein the processor and voltage regulator are to be located in a same package.

11. The system of claim 9, wherein the processor is to, according to the first plan, control the voltage regulator to:
actively regulate the processor voltage from the first voltage to the second voltage during a first portion of the low power period;
after the processor voltage is reduced to the second voltage, actively maintain the processor voltage at the second voltage during a second portion of the low power period until a processor wakeup instruction is received; and
in response to the processor wakeup instruction, increase the processor voltage from the second voltage to the first voltage during a third portion of the low power period.

12. The system of claim 9, wherein according to the first plan and the second plan
the voltage regulator is to actively regulate the processor voltage during a third portion of the low power period wherein the processor voltage is to be increased from the second voltage to the first voltage.

13. The system of claim 9, wherein according to a third plan:
the voltage regulator is to be deactivated during a voltage reduction phase, wherein the processor voltage is to be reduced from the first voltage to the second voltage;
the voltage regulator is to be deactivated during a steady state phase in which the processor voltage is to be maintained at approximately the second voltage, wherein the second voltage is zero volts; and
the voltage regulator is to actively regulate the processor voltage during a reinstatement phase in which the processor voltage is to be increased from the second voltage to the first voltage.

14. A non-transitory machine-readable medium having stored thereon instructions, which if performed by a machine cause the machine to perform a method comprising:
predicting first energy usage by a system that includes a processor and a voltage regulator during a low power period wherein a voltage that is to be provided to the processor is lower than a first voltage, according to a first plan in which the voltage regulator is to be in an active state throughout the low power period;
predicting, based at least in part on voltage versus time decay data, second energy usage by the system during the low power period according to a second plan wherein the voltage regulator is to be deactivated during at least a first time portion of the low power period and to be active during a second time portion of the low power period wherein the voltage is to be maintained at approximately a second voltage; and
selecting one of the first plan and the second plan based on a comparison of the first energy usage with the second energy usage.

15. The non-transitory machine-readable medium of claim 14, wherein the low power period includes a
reinstatement of the voltage to the first voltage during a third time portion of the low power period.

16. The non-transitory machine-readable medium of claim 15, wherein the method further comprises predicting a duration of the third time portion, wherein the first energy usage and the second energy usage are to be predicted further based on a predicted duration of the third time portion.

17. The non-transitory machine-readable medium of claim 14, wherein the method further includes predicting an idle time duration within the low power period, and wherein the first energy usage and the second energy usage are to be predicted further based on the predicted idle time duration.

18. The non-transitory machine-readable medium of claim 14, wherein each of the first plan and the second plan specifies one of a fully operational state and a reduced operational state of a first circuit of the processor for each portion of the low power period.

19. The non-transitory machine-readable medium of claim 14, wherein the method further comprises:
   predicting, based on voltage versus time decay data, third energy usage by the system during the low power period according to a third plan wherein a first circuit of an uncore portion of the processor is to be operated at a reduced capacity during at least a portion of the low power period; and
   selecting one of the first plan, the second plan, and the third plan based on a comparison of the first energy usage, the second energy usage, and the third energy usage.

20. The non-transitory machine-readable medium of claim 19, wherein the third plan specifies one of an active state of the voltage regulator and a reduced activity state of the voltage regulator for each portion of the low power period.

* * * * *